United States Patent
Wakabayashi et al.

(10) Patent No.: US 11,465,069 B2
(45) Date of Patent: Oct. 11, 2022

(54) DIABATIC DISTILLATION COLUMN

(71) Applicant: TOYO ENGINEERING CORPORATION, Tokyo (JP)

(72) Inventors: Toshihiro Wakabayashi, Narashino (JP); Masaki Togo, Narashino (JP)

(73) Assignee: TOYO ENGINEERING CORPORATION, Tokyo (JP)

( * ) Notice: Subject to any disclaimer, the term of this patent is extended or adjusted under 35 U.S.C. 154(b) by 0 days.

(21) Appl. No.: 16/980,738

(22) PCT Filed: Nov. 30, 2018

(86) PCT No.: PCT/JP2018/044164
§ 371 (c)(1),
(2) Date: Sep. 14, 2020

(87) PCT Pub. No.: WO2019/176188
PCT Pub. Date: Sep. 19, 2019

(65) Prior Publication Data
US 2021/0001245 A1    Jan. 7, 2021

(30) Foreign Application Priority Data
Mar. 15, 2018 (JP) .............................. JP2018-047652

(51) Int. Cl.
*B01D 3/32* (2006.01)
*B01D 3/14* (2006.01)
*B01D 3/00* (2006.01)

(52) U.S. Cl.
CPC ............... *B01D 3/32* (2013.01); *B01D 3/007* (2013.01); *B01D 3/14* (2013.01); *B01D 3/322* (2013.01)

(58) Field of Classification Search
CPC ................................ B01D 3/007; C08G 71/04
See application file for complete search history.

(56) References Cited

U.S. PATENT DOCUMENTS 5,932,074 A    8/1999   Hoiss
5,964,986 A *  10/1999  Meili .................. B01D 1/2806
                                                    202/155
(Continued)

FOREIGN PATENT DOCUMENTS

JP    59-086202 U    6/1984
JP    2011-078872 A  4/2011
(Continued)

OTHER PUBLICATIONS

Nakaiwa et al., "Innovation in Distillation Processes," Synthesiology, Feb. 2009, vol. 2, No. 1, pp. 51-59.
(Continued)

*Primary Examiner* — Jonathan Luke Pilcher
(74) *Attorney, Agent, or Firm* — Foley & Lardner LLP

(57) ABSTRACT

Diabatic distillation column 1 includes first and second cooling devices 11, 12 configured to indirectly cool fluid in rectifying section 2 with a circulating working fluid, first and second heating devices 21, 22 configured to indirectly heat fluid in stripping section 3 with the circulating working fluid, first compressor 31 configured to compress the working fluid from first cooling device 11 on first circulation path P11-P14 between first cooling device 11 and first heating device 21, second compressor 32 configured to compress the working fluid from second cooling device 12 on second circulation path P21-P24 between second cooling device 12 and second heating device 22, first expansion device 41 configured to expand the working fluid from first heating device 21 on first circulation path P11-P14, and second expansion device 42 configured to expand the working fluid from second heating device 22 on second circulation path P21-P24.

10 Claims, 3 Drawing Sheets

(56) References Cited

U.S. PATENT DOCUMENTS 6,589,395 B1   7/2003  Meili
6,605,190 B1   8/2003  Salamon et al.

FOREIGN PATENT DOCUMENTS

JP         4803470 B2    10/2011
JP       2015-205248 A   11/2015
WO     WO-2017/018684    2/2017

OTHER PUBLICATIONS

International Search Report issued in International Patent Application No. PCT/JP2018/044164, dated Nov. 30, 2018 with English language translation.
European Extended Search Report dated Jul. 30, 2021 in related European Patent Application 18909747.0, 8 pages.
IN First Examination Report on Application No. 202047043818 dated Mar. 15, 2022.

* cited by examiner

DIABATIC DISTILLATION COLUMN

CROSS-REFERENCE TO RELATED APPLICATIONS

This application is the U.S. National Stage of International Patent Application No. PCT/JP2018/044164, filed Nov. 30, 2018, which claims priority from Japanese Patent Application No. 2018-047652, filed Mar. 15, 2018. The contents of these applications are incorporated herein by reference in their entirety.

TECHNICAL FIELD

The present invention relates to a diabatic distillation column.

BACKGROUND ART

A distillation operation is widely used in industrial processes such as petroleum refining and petrochemicals, whereas it is also a unit operation with very large energy consumption. Therefore, many studies have been conducted for the purpose of energy saving in the distillation operation.

Theoretically, a hypothetical operation called a reversible distillation operation is known to be the most efficient distillation operation (see, for example, Non-Patent Literature 1). The reversible distillation operation is an operation in which continuous cooling in a rectifying section (a section above a feedstock supply position) of a distillation column and continuous heating in a stripping section (a section below the feedstock supply position) thereof are conducted along the height direction. Specifically, it is an operation in which, under assumption of a distillation column with infinite number of stages, infinitely small amount of heat is removed for cooling in each stage of the rectifying section, and infinitely small amount of heat is supplied for heating in each stage of the stripping section. How to faithfully realize such a hypothetical operation in an actual apparatus is an important guideline for achieving energy saving in the distillation operation.

As a configuration for realizing the concept of the above-described reversible distillation operation, Patent Literature 1 proposes a heat integrated distillation apparatus called SUPERHIDIC®. This distillation apparatus includes a rectifying column, a stripping column installed above the rectifying column, a compressor for compressing vapor from a column top section of the stripping column and then supplying it to a column bottom section of the rectifying column, a heat exchanger provided at a predetermined position in the rectifying column, and a liquid withdrawal unit provided at a predetermined position in the stripping column for withdrawing a portion of liquid in the stripping column. The liquid that has been withdrawn from the liquid withdrawal unit is introduced into the heat exchanger, thereby removing heat from the vapor in the rectifying column, and a fluid that is obtained by introducing the liquid into the heat exchanger and that contains both liquid and vapor phases is introduced immediately below the liquid withdrawal unit, thereby transferring the heat to the stripping column. A plurality of the heat exchangers and a plurality of the liquid withdrawal units are installed, so that cooling at a plurality of appropriate positions in the rectifying column can be conducted, and heating at a plurality of appropriate positions in the stripping column can be conducted. Thus, an operation similar to the reversible distillation operation can be achieved.

Accordingly, in the above-described distillation apparatus, as compared with a general distillation column, both the amount of heat removed from the condenser provided in the column top section of the rectifying column and the amount of heat supplied to the reboiler provided in the column bottom section of the stripping column can be reduced so as to improve the energy saving performance. Further, this distillation apparatus is also advantageous in that, since the fluid circulation between the rectifying column and the stripping column is provided by thermosiphon effect, a pumping means such as a pump is not required.

CITATION LIST

Patent Literature

Patent Literature 1: JP 4803470 B

Non-Patent Literature

Non-Patent Literature 2: Masaru Nakaiwa et al., "Innovation in distillation processes", Synthesiology, National Institute of Advanced Industrial Science and Technology (AIST), February 2009, Vol. 2, No. 1, p. 51-59

SUMMARY OF THE INVENTION

Technical Problem

In the configuration described in Patent Literature 1, vapor from the column top section of the stripping column is compressed by the compressor, and the compressed and heated vapor is supplied to the column bottom section of the rectifying column. In this case, an unavoidable pressure drop occurs in a pipe connecting from the column top section of the stripping column to the compressor and in devices provided through the pipe. Therefore, if the configuration described in Patent Literature 1 is applied to a system with low operating pressure such as a vacuum distillation apparatus, the pressure drop becomes a factor that greatly influences the compression ratio of the compressor and that severely degrades the energy saving performance. From this viewpoint, it is desired that a configuration for realizing the concept of the reversible distillation can be applied even to the system with low operating pressure such as the vacuum distillation apparatus.

It is therefore an object of the present invention to provide a diabatic distillation column with excellent energy saving performance regardless of operating pressure.

Solution to Problem

To achieve the above-described object, according to an embodiment of the present invention, a diabatic distillation column with a rectifying section located above a feedstock supply position and a stripping section located below the feedstock supply position, includes a plurality of cooling devices configured to indirectly cool fluid in the rectifying section with a working fluid, the cooling devices including a first cooling device provided at a first position in the rectifying section and a second cooling device provided at a second position below the first position in the rectifying section, a plurality of heating devices arranged such that the working fluid circulates between the plurality of heating devices and the plurality of cooling devices and configured to indirectly heat fluid in the stripping section with the circulating working fluid, the heating devices including a first heating device provided at a first position in the stripping section and a second heating device provided at a second position below the first position in the stripping section, a plurality of compressors including a first compressor and a second compressor, the first compressor provided on a first circulation path for circulating the working fluid between the first cooling device and the first heating device and configured to compress the working fluid from the first cooling device, the second compressor provided on a second circulation path for circulating the working fluid between the second cooling device and the second heating device and configured to compress the working fluid from the second cooling device, and a plurality of expansion devices including a first expansion device and a second expansion device, the first expansion device provided on the first circulation path and configured to expand the working fluid from the first heating device, the second expansion device provided on the second circulation path and configured to expand the working fluid from the second heating device.

According to another embodiment of the present invention, a diabatic distillation column with a rectifying section located above a feedstock supply position and a stripping section located below the feedstock supply position, includes a plurality of cooling devices provided at different positions in a height direction of the rectifying section and configured to indirectly cool fluid in the rectifying section with a working fluid, a plurality of heating devices arranged such that the working fluid circulates between the plurality of heating devices and the plurality of cooling devices and configured to indirectly heat fluid in the stripping section with the circulating working fluid, the heating devices including a first heating device provided at a first position in the stripping section and a second heating device provided at a second position below the first position in the stripping section, a plurality of compressors including a first compressor and a second compressor, the first compressor provided on a first circulation path for circulating the working fluid between the plurality of cooling devices and the first heating device and configured to compress the working fluid from the plurality of cooling devices, the second compressor provided on a second circulation path for circulating the working fluid between the first circulation path and the second heating device and configured to compress the working fluid from the first circulation path, and a plurality of expansion devices including a first expansion device and a second expansion device, the first expansion device provided on the first circulation path and configured to expand the working fluid from the first heating device, the second expansion device provided on the second circulation path and configured to expand the working fluid from the second heating device.

According to the diabatic distillation column, cooling at a plurality of appropriate positions in the rectifying section can be conducted by the plurality of cooling devices, and heating at a plurality of appropriate positions in the stripping section can be conducted by the plurality of heating devices, whereby the hypothetical reversible distillation operation can be accomplished in the actual apparatus in a simulated manner. Further, since the cooling and heating with the working fluid are conducted through the compression and expansion thereof, an energy-efficient cooling and heating system can be achieved. In addition, this cooling and heating operations are conducted separately from the distillation operation in the distillation column. Therefore, even when a distillation operation with low operating pressure such as vacuum distillation is accomplished, a pressure drop that occurs in the suction side of the compressor does not influence the overall energy saving performance, unless the pressure of the working fluid itself is set low.

Advantageous Effects of Invention

As described above, according to the present invention, it is possible to provide a diabatic distillation column with excellent energy saving performance regardless of operating pressure.

DESCRIPTION OF EMBODIMENTS

Embodiments of the present invention will be described below with reference to the drawings.

First Embodiment

Figure 1:
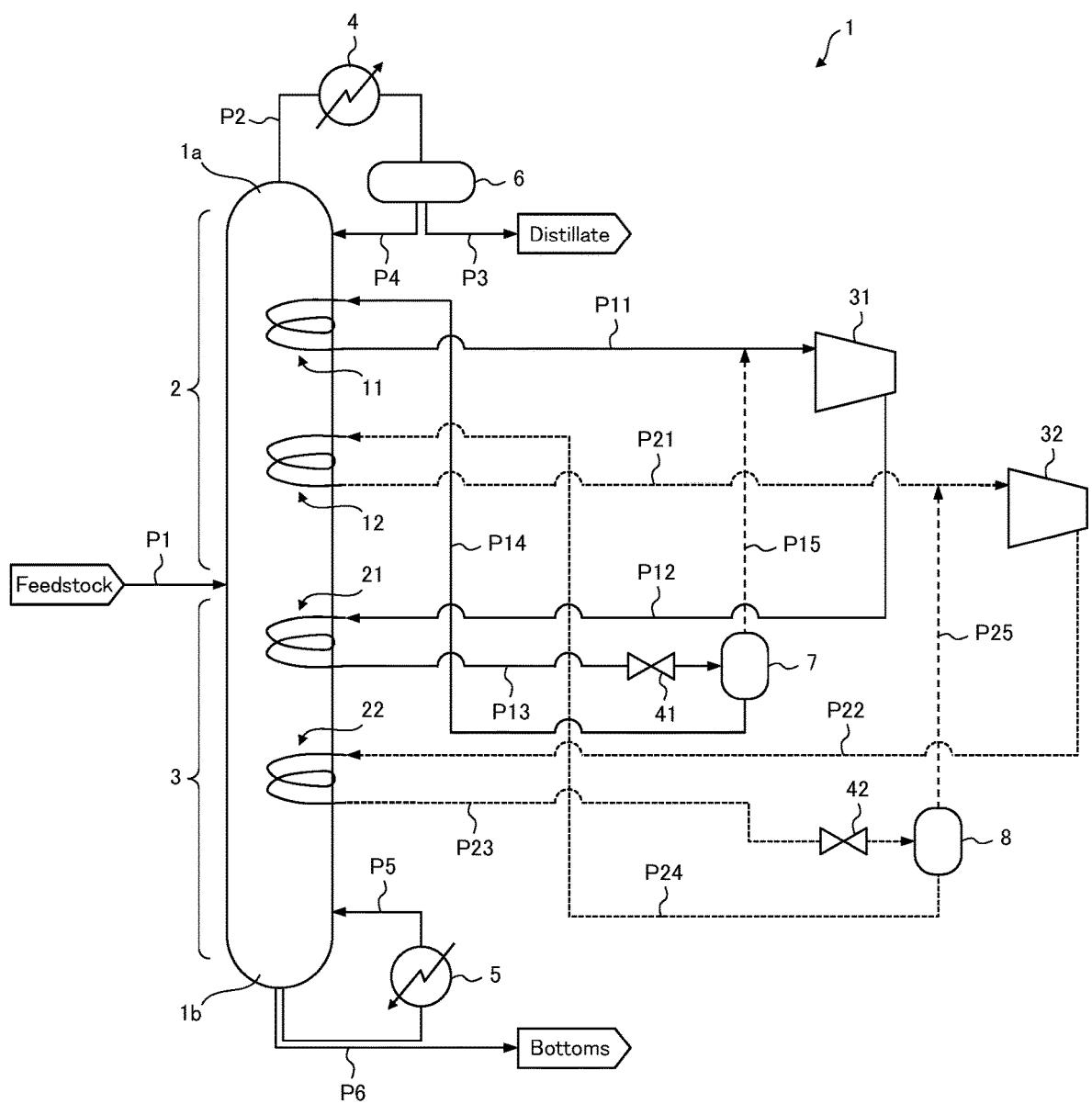
FIG. 1 is a schematic configuration diagram of a diabatic distillation column according to a first embodiment of the present invention.

FIG. 1 is a schematic configuration diagram of a diabatic distillation column according to a first embodiment of the present invention. It should be noted that the illustrated configuration is merely an example and can be appropriately changed in accordance with the purpose of use, the intended application, and the required performance, for example by adding pipes or valves, or by modifying the positions of the pipes, or the like.

Diabatic distillation column (hereinafter simply referred to as "distillation column") 1 of this embodiment is composed of, like a general distillation column, rectifying section 2 located above a feedstock supply position to which a feedstock is supplied (to which feedstock supply pipe P1 is connected), and stripping section 3 located below the feedstock supply position, and includes condenser 4 and reboiler 5. In this embodiment, distillation column 1 is a tray column having multiple horizontal shelves (i.e. trays) installed in the column, but it may be a packed bed column having a certain packing, on the surface of which vapor-liquid contact is performed, installed in the hollow column.

At each stage of the tray column (each space between the adjacent trays), vapor-liquid contact is promoted, so that mass transfer occurs. As a result, a vapor phase rich in components with higher volatility moves up to a stage above this stage, and a liquid phase rich in components with lower volatility flows down to a stage below this stage. Subsequently, at each stage, vapor-liquid contact with another liquid or vapor phase is further performed, so that mass transfer occurs. This causes an abundance of components with higher volatility at a higher stage of the column and an abundance of components with lower volatility at a lower stage of the column, which means that a distillation operation is accomplished. On the other hand, in the packed bed column, the same mechanism as that in the tray column causes an abundance of components with higher volatility at a higher stage of the column and an abundance of components with lower volatility at a lower stage of the column, which means that a distillation operation is accomplished.

Condenser 4 is provided on pipe P2 connected to column top section 1a of distillation column 1, and functions to cool vapor that has risen to column top section 1a. Thus, the vapor in column top section 1a is cooled and condensed to liquid by condenser 4, and then is fed to drum 6. A portion of the liquid is obtained through pipe P3 as a liquid distillate product rich in components with high volatility, and the remaining portion is returned to column top section 1a as required through pipe P4 connected to the upper space of rectifying section 2.

Reboiler 5 is provided on pipe P5 that connects column bottom section 1b of distillation column 1 and the upper space of column bottom section 1b. Reboiler 5 functions to heat a column bottom liquid of distillation column 1 (i.e. liquid that has flowed down distillation column 1 into column bottom section 1b). Thus, a portion of the column bottom liquid of distillation column 1 is heated and vaporized by reboiler 5, and then rises toward column bottom section 1b of distillation column 1. From the bottom of column bottom section 1b, a liquid bottoms product rich in components with low volatility can be obtained through pipe P6.

Distillation column 1 of this embodiment includes a plurality of cooling devices 11, 12, a plurality of heating devices 21, 22, a plurality of compressors 31, 32, and a plurality of expansion devices 41, 42. As detailed below, these constitute a plurality of independent circulation paths for circulating a working fluid to indirectly cool and heat fluid in distillation column 1. In the illustrated embodiment, the numbers of cooling devices, heating devices, compressors, and expansion devices are two, respectively, but may be three or more as described later.

Cooling devices 11, 12 includes first cooling device 11 provided at a predetermined stage (a first position) of rectifying section 2 and second cooling device 12 provided at a stage (a second position) below that stage. First and second cooling devices 11, 12 are each composed of a heat exchanger and function to indirectly cool fluid in rectifying section 2 with the circulating working fluid.

Heating devices 21, 22 includes first heating device 21 provided at a predetermined stage (a first position) of stripping section 3 and second heating device 22 provided at a stage (a second position) below that stage. First and second heating devices 21, 22 are each composed of a heat exchanger and function to indirectly heat fluid in stripping section 3 with the circulating working fluid.

Compressors 31, 32 includes first compressor 31 and second compressor 32, and expansion devices (expansion valves) 41, 42 includes first expansion device 41 and second expansion device 42.

First compressor 31 and first expansion device 41 are provided on first circulation path P11-P14 for circulating the working fluid between first cooling device 11 and first heating device 21. Specifically, first compressor 31 is connected, on the suction side, to first cooling device 11 through pipe P11, and is connected, on the discharge side, to first heating device 21 through pipe P12. First expansion device 41 is connected, on the primary side, to first heating device 21 through pipe P13, and is connected, on the secondary side, to first cooling device 11 thorough drum 7 and pipe P14.

Therefore, first compressor 31 functions to compress and heat the working fluid from first cooling device 11 and then to supply it to first heating device 21, and first expansion device 41 functions to expand and cool the working fluid from first heating device 21 and then to supply it to first cooling device 11. Accordingly, first cooling device 11 can indirectly cool fluid in rectifying section 2 with the working fluid that has cooled by first expansion device 41, and first heating device 21 can indirectly heat fluid in stripping section 3 with the working fluid that has heated by first compressor 31.

On the other hand, second compressor 32 and second expansion device 42 are provided on second circulation path P21-P24 for circulating the working fluid between second cooling device 12 and second heating device 22. Specifically, second compressor 32 is connected, on the suction side, to second cooling device 12 through pipe P21, and is connected, on the discharge side, to second heating device 22 through pipe P22. Second expansion device 42 is connected, on the primary side, to second heating device 22 through pipe P23, and is connected, on the secondary side, to second cooling device 12 through drum 8 and pipe P24.

Therefore, second compressor 32 functions to compress and heat the working fluid from second cooling device 12 and then to supply it to second heating device 22, and second expansion device 42 functions to expand and cool the working fluid from second heating device 22 and then to supply it to second cooling device 12. Accordingly, second cooling device 12 can indirectly cool fluid in rectifying section 2 with the working fluid that has cooled by second expansion device 42, and second heating device 22 can indirectly heat fluid in stripping section 3 with the working fluid that has heated by second compressor 32.

Drum 7 on first circulation path P11-P14 is connected to pipe P11 on the suction side of first compressor 31. Drum 8 on second circulation path P21-P24 is connected to pipe P21 on the suction side of second compressor 32 through pipe P25. These drums 7, 8 are provided for separating the working fluid into gas and liquid phases to introduce the gas phase directly into first and second compressors 32, respectively.

Thus, according to this embodiment, cooling at a plurality of appropriate positions in rectifying section 2 can be conducted by cooling devices 11, 12, and heating at a plurality of appropriate positions in stripping section 3 can be conducted by heating devices 21, 22. Therefore, the hypothetical reversible distillation operation can be accomplished in the actual apparatus in a simulated manner, and the energy saving performance can be improved. Further, in this embodiment, since the cooling and heating are conducted through the compression of the working fluid by compressor 31, 32 and the expansion of the working fluid by expansion devices 41, 42, an energy-efficient cooling and heating system can be achieved. In addition, this cooling and heating operations are conducted separately from the distillation operation in distillation column 1. Therefore, even when a distillation operation with low operating pressure such as vacuum distillation is accomplished, the pressure of the working fluid is not influenced by such a low operating pressure. Accordingly, unless the pressure of the working fluid itself is set low, even if a pressure drop occurs in the suction side of compressors 31, 32, such a pressure drop does not influence the overall energy saving performance.

The numbers of cooling devices and heating devices are not limited to two as illustrated, but may be three or more, respectively, depending on the amount of heat load to be applied to the distillation column, and accordingly the numbers of compressors and expansion devices may also be three or more, respectively. In this case, i.e., in the case where the number of circulation paths of the working fluid is three or more, at least two circulation paths of them may have the illustrated configuration. Further, in the illustrated embodiment, the cooling devices are provided at intermediate stages of the rectifying section and the heating devices are provided at intermediate stages of the stripping section, but the positions of the cooling devices and the heating devices are not limited thereto. For example, the uppermost one of the cooling devices may be used as a heat sink for the condenser, or the lowermost one of the heating devices may be used as a heat source for the reboiler.

As described above, since the cooling and heating operations with the working fluid are conducted separately from the distillation operation, there is no particular limitation on the type of the working fluid to be used. Therefore, the most suitable working fluids can be selected in consideration of various conditions (such as temperature and the like). From a safety point of view, such working fluids include, for example, water (water vapor) and a chlorofluorocarbon alternative. In particular, water (water vapor) is preferably used, taking into consideration the fact that it is very inexpensive and that it does not matter environmentally even if leakage occurs.

Second Embodiment

Figure 2:
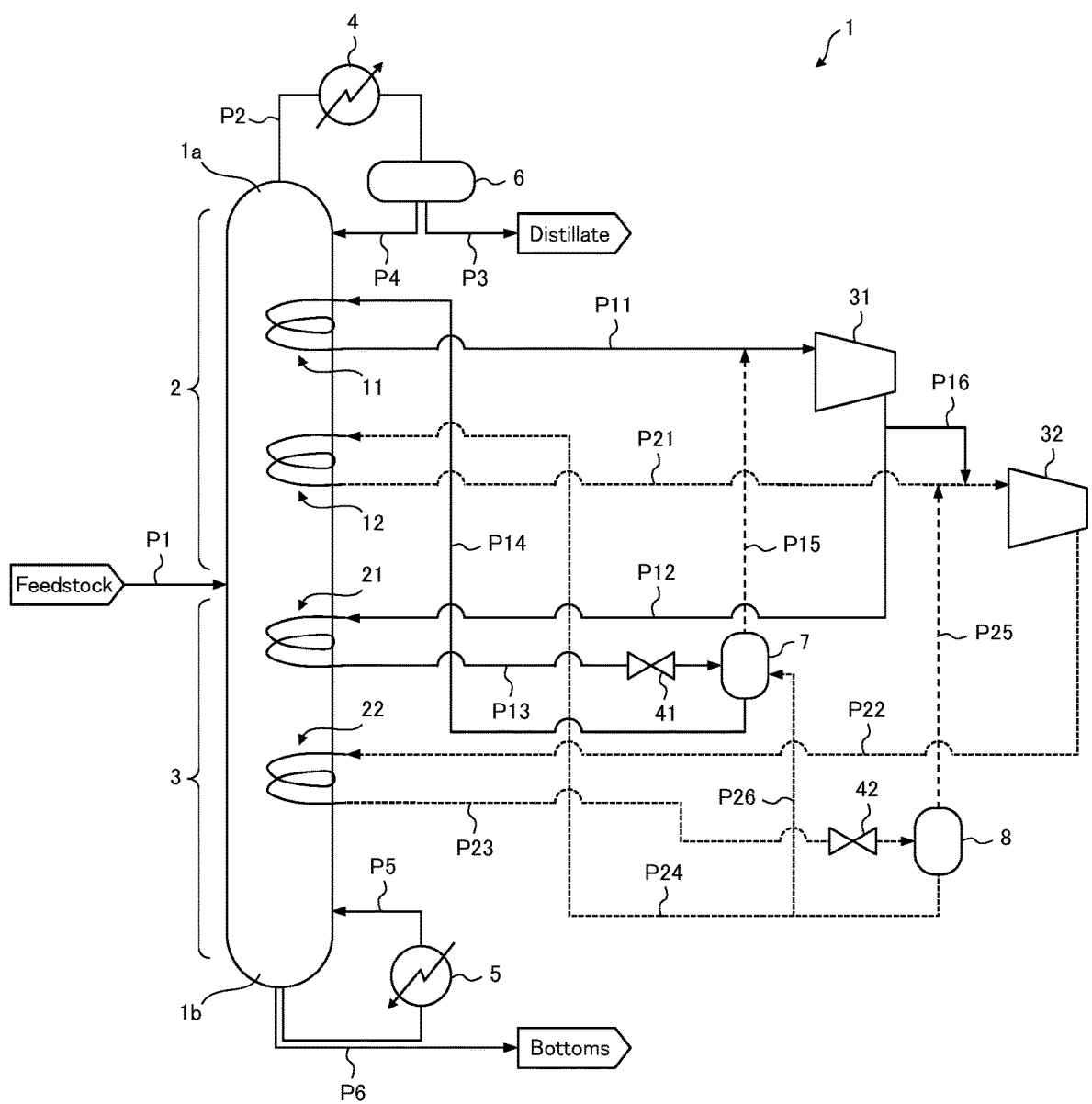
FIG. 2 is a schematic configuration diagram of a diabatic distillation column according to a second embodiment of the present invention.

FIG. 2 is a schematic configuration diagram of a diabatic distillation column according to a second embodiment of the present invention. Hereinafter, components identical to those of the first embodiment will be denoted by identical reference numerals in the drawings, description thereof will be omitted, and only components that are different from those of the first embodiment will be described.

In the first embodiment, the two circulation paths are not connected to each other and are provided independently. On the other hand, in this embodiment, the two circulation paths are connected to each other such that the working fluid flows back and forth between them. Specifically, pipe P12 on the discharge side of first compressor 31 is connected to pipe P21 on the suction side of second compressor 32 through pipe P16 such that the working fluid from first compressor 31 is supplied even to second compressor 32. In addition, pipe P24 on the secondary side of second expansion device 42 is connected to drum 7 through pipe P26 such that the working fluid from second expansion device 42 is supplied even to first cooling device 11. Therefore, in this embodiment, first circulation path P11-P14 and second circulation path P21-P24 are connected to each other through pipes P16, P26.

The fact that first circulation path P11-P14 and second circulation path P21-P24 are connected to each other is advantageous in that the flow of working fluid allows appropriate distribution of the heat load. Further, with this configuration, first compressor 31 and second compressor 32 are connected in series, and therefore, as compared with the first embodiment, the compression ratio of second compressor 32 can be reduced so as to reduce the total workload of the compressors. In the illustrated example, first compressor 31 and second compressor 32 are provided separately, but may be combined into one multistage compressor. In this case, power sources of compressors 31, 32 may also be combined into one, which leads to cost reduction.

Also in this embodiment, the number of circulation paths of the working fluid may be three or more, and in this case, at least two circulation paths of them may have the illustrated configuration.

Third Embodiment

Figure 3:
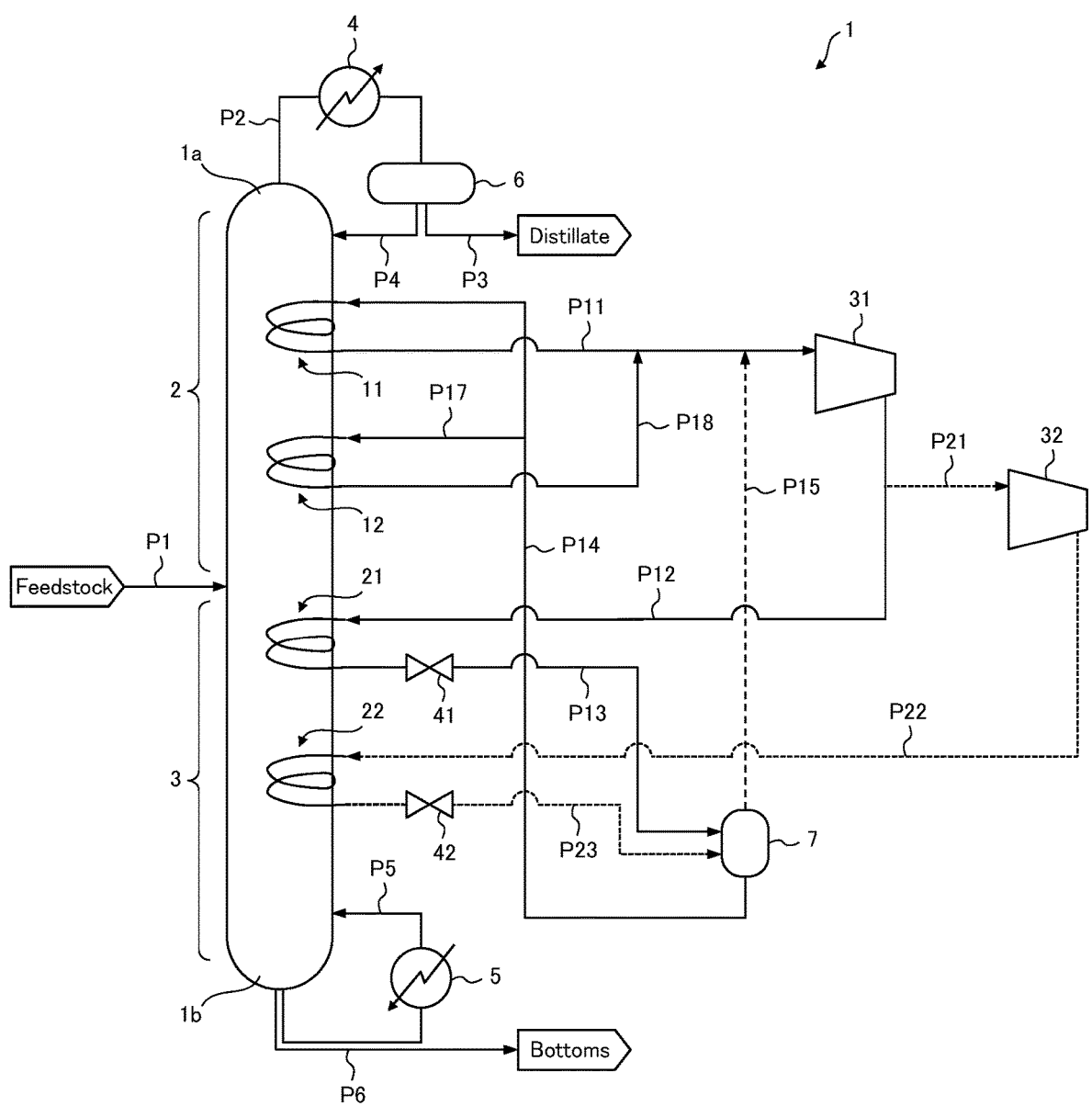
FIG. 3 is a schematic configuration diagram of a diabatic distillation column according to a third embodiment of the present invention.

FIG. 3 is a schematic configuration diagram of a diabatic distillation column according to a third embodiment of the present invention. Hereinafter, components identical to those of the above-described embodiments will be denoted by identical reference numerals in the drawings, description thereof will be omitted, and only components that are different from those of the above-described embodiments will be described.

This embodiment differs from the above-described embodiments in that two cooling devices 11, 12 are connected in parallel. Specifically, second cooling device 12 of this embodiment is connected, on the inlet side, to pipe P14 on the inlet side of first cooling device 11 through pipe P17, and is connected, on the outlet side, to pipe P11 on the outlet side of first cooling device 11 through pipe P18. Accordingly, pipe P21 on the suction side of second compressor 32 is connected to pipe P12 on the discharge side of first compressor 31, and therefore, as in the second embodiment, first compressor 31 and second compressor 32 are connected in series. Further, drum 8 and pipes P24, P25 of the above-described embodiments are omitted, and pipe P23 on the outlet side of second heating device 22 is connected to drum 7.

In other words, in this embodiment, first circulation path P11-P14, P17-P18 is arranged to circulate the working fluid between cooling devices 11, 12 and first heating device 21, and first compressor 31 and first expansion device 41 are provided on this circulation path P11-P14, P17-P18. Second circulation path P21-P23 is arranged to circulate the working fluid between first circulation path P11-P14, P17-P18 and second heating device 22, and second compressor 32 and second expansion device 42 are provided on this circulation path P21-P23.

Therefore, first compressor 31 functions to compress and heat the working fluid from cooling devices 11, 12 and then to supply it to first heating device 21, and first expansion device 41 functions to expand and cool the working fluid from first heating device 21 and then to supply it to cooling devices 11, 12. Second compressor 32 functions to compress and heat the working fluid from first circulation path P11-P14, P17-P18 and then to supply it to second heating device 22, and second expansion device 42 functions to expand and cool the working fluid from second heating device 22 and then to supply it to cooling devices 11, 12.

Thus, this embodiment is preferably used when the heat load is required to be distributed to positions in rectifying section 2 (different positions in the height direction) where the heat load needs to be applied, because cooling devices 11, 12 are connected in parallel. Therefore, the configuration of this embodiment can be used in combination with the first embodiment or the second embodiment. Further, also in this embodiment, similarly to the second embodiment, cost reduction of the compressors and the effect of reducing the compression ratio thereof can be expected.

This embodiment is the same as the above-described embodiments in that the numbers of cooling devices and heating devices may be three or more, respectively. However, unlike the above-described embodiments, for the structural reason that the cooling devices are connected in parallel, the number of cooling devices may not necessarily be the same as the number of heating devices. For example, depending on the amount of heat load to be applied to the distillation column, three or more cooling devices may be provided for two heating devices, or two cooling devices may be provided for three or more heating devices.

REFERENCE SIGNS LIST

1 Diabatic distillation column
2 Rectifying section

3 Stripping section
4 Condenser
5 Reboiler
6-8 Drums
11 First cooling device
12 Second cooling device
21 First heating device
22 Second heating device
31 First compressor
32 Second compressor
41 First expansion device
42 Second expansion device
P1 Feedstock supply pipe
P2-P6, P11-P16, P21-P26 Pipes

The invention claimed is:

1. A diabatic distillation column comprising:
a column body having a rectifying section located above a feedstock supply position and a stripping section located below the feedstock supply position;
a plurality of cooling devices including a first cooling device located at a first position in the rectifying section and a second cooling device located at a second position below the first position in the rectifying section;
a plurality of heating devices including a first heating device located at a first position in the stripping section and a second heating device located at a second position below the first position in the stripping section;
a plurality of circulation paths for circulating a working fluid, the circulation paths including a first circulation path on which the first cooling device is provided for cooling fluid in the rectifying section with working fluid circulating in the first circulation path and on which the first heating device is provided for heating fluid in the stripping section with the working fluid circulating in the first circulation path, and a second circulation path on which the second cooling device is provided for cooling fluid in the rectifying section with working fluid circulating in the second circulation path and on which the second heating device are provided for heating fluid in the stripping section with the working fluid circulating in the second circulation path;
a plurality of compressors including a first compressor and a second compressor, the first compressor provided on the first circulation path downstream of the first cooling device and upstream of the first heating device for compressing a working fluid that has flowed through the first cooling device, the second compressor provided on the second circulation path downstream of the second cooling device and upstream of the second heating device for compressing a working fluid that has flowed through the second cooling device;
a plurality of expansion devices including a first expansion device and a second expansion device, the first expansion device provided on the first circulation path downstream of the first heating device and upstream of the first cooling device for expanding a working fluid that has flowed through the first heating device, the second expansion device provided on the second circulation path downstream of the second heating device and upstream of the second cooling device for expanding a working fluid that has flowed through the second heating device;
a plurality of drums including a first drum and a second drum, the first drum provided on the first circulation path downstream of the first expansion device and upstream of the first cooling device for separating gas from a working fluid that has flowed through the first expansion device, the second drum provided on the second circulation path downstream of the second expansion device and upstream of the second cooling device for separating gas from a working fluid that has flowed from the second expansion device; and
a plurality of flow paths including a first flow path for the gas separated by the first drum and a second flow path for the gas separated by the second drum, the first flow path connecting the first drum to the first circulation path downstream of the first cooling device and upstream of the first compressor, the second flow path connecting the second drum to the second circulation path downstream of the second cooling device and upstream of the second compressor.

2. The diabatic distillation column according to claim 1, wherein the first circulation path and the second circulation path are connected to each other such that a portion of the working fluid circulating in the first circulation path flows into the second circulation path and a portion of the circulating working fluid in the second circulation path flows into the first circulation path.

3. The diabatic distillation column according to claim 2, further comprising two pipes connecting the first circulation path and the second circulation path, the two pipes including:
a first pipe having an upstream end connected to the first circulation path downstream of the first compressor and upstream of the first heating device and a downstream end connected to the second circulation path downstream of the second cooling device and upstream of the second compressor; and
a second pipe having an upstream end connected to the second circulation path downstream of the second drum and upstream of the second cooling device and a downstream end connected to the first drum.

4. The diabatic distillation column according to claim 1, wherein the first circulation path and the second circulation path are provided independently.

5. The diabatic distillation column according to claim 1, wherein the plurality of cooling devices includes an uppermost cooling device that is used as a condenser connected to a column top section of the distillation column and configured to cool fluid in the column top section.

6. The diabatic distillation column according to claim 1, wherein the plurality of heating devices includes a lowermost heating device that is used as a reboiler connected to a column bottom section of the distillation column and configured to heat fluid in the column bottom section.

7. A diabatic distillation column comprising:
a column body having a rectifying section located above a feedstock supply position and a stripping section located below the feedstock supply position;
a plurality of cooling devices located at different positions in a height direction of the rectifying section;
a plurality of heating devices including a first heating device located at a first position in the stripping section and a second heating device located at a second position below the first position in the stripping section;
a fluid circulation path for circulating a working fluid, on which the plurality of cooling devices is provided, so as to be supplied with the working fluid in parallel, for cooling fluid in the rectifying section with the working fluid circulating in the fluid circulation path and on which the first heating device is provided for heating fluid in the stripping section with the working fluid circulating in the fluid circulation path;

a fluid flow path for flow of the working fluid, on which the second heating device is provided for heating fluid in the stripping section with the working fluid flowing in the fluid flow path, the fluid flow path having an upstream end connected to the fluid circulation path downstream of the plurality of cooling devices and upstream of the first heating device, and a downstream end connected to the fluid circulation path downstream of the first heating device and upstream of the plurality of cooling devices;

a plurality of compressors including a first compressor and a second compressor, the first compressor provided on the fluid circulation path downstream of the plurality of cooling devices and upstream of a connection point to the upstream end of the fluid flow path for compressing a working fluid that has flowed through the plurality of cooling devices, the second compressor provided on the fluid flow path upstream of the second heating device for compressing a working fluid that has flowed from the fluid circulation path; and a plurality of expansion devices including a first expansion device and a second expansion device, the first expansion device provided on the fluid circulation path downstream of the first heating device and upstream of a connection point to the downstream end of the fluid flow path for expanding a working fluid that has flowed through the first heating device, the second expansion device provided on the fluid flow path downstream of the second heating device for expanding a working fluid that has flowed through the second heating device;

a drum provided at the connection point of the fluid circulation path and the downstream end of the fluid flow path for separating gas from a working fluid that has flowed through the first and second expansion devices; and a gas flow path for the gas separated by the drum, the gas flow path connecting the drum to the fluid circulation path downstream of the plurality of cooling devices and upstream of the first compressor.

8. The diabatic distillation column according to claim 7, wherein the plurality of cooling devices includes an uppermost cooling device that is used as a condenser connected to a column top section of the distillation column and configured to cool fluid in the column top section.

9. The diabatic distillation column according to claim 7, wherein the plurality of heating devices includes a lowermost heating device that is used as a reboiler connected to a column bottom section of the distillation column and configured to heat fluid in the column bottom section.

10. The diabatic distillation column according to claim 7, wherein the working fluid is water.

* * * * *